United States Patent [19]

Salomon

[11] Patent Number: 4,709,653
[45] Date of Patent: Dec. 1, 1987

[54] MECHANICAL FLUID INDICATOR

[76] Inventor: Lothar H. Salomon, 1813 Jack Frost Rd., Virginia Beach, Va. 23455

[21] Appl. No.: 466,892

[22] Filed: Mar. 29, 1983

[51] Int. Cl.⁴ ............................................. G01F 23/30
[52] U.S. Cl. ..................................... 116/228; 73/321
[58] Field of Search ............... 116/228, 227, 109, 110, 116/278; 73/305, 309, 319, 321, 322.5; 474/148, 150; 403/26, 365; 242/55.2

[56] References Cited

U.S. PATENT DOCUMENTS

| 1,208,026 | 6/1916 | Smith | 116/228 |
| 1,379,271 | 5/1921 | Malinowsky | 73/321 |
| 1,512,752 | 10/1924 | Fisk | 73/321 |
| 1,886,304 | 11/1932 | Rathbone et al. | 116/228 |
| 1,977,434 | 10/1934 | Eynon | 116/228 |
| 2,006,531 | 7/1935 | Arntzen | 116/228 |
| 3,010,425 | 11/1961 | Peavey, Jr. | 116/278 |
| 3,362,653 | 1/1968 | Carlisle | 242/55.2 |
| 3,739,524 | 6/1973 | Rose | 116/228 |
| 3,952,695 | 4/1976 | Vollstedt | 116/173 |
| 4,154,103 | 5/1979 | Fling | 73/322.5 |
| 4,379,434 | 4/1983 | Thordarson | 116/228 |

FOREIGN PATENT DOCUMENTS 1076587 10/1954 France .................................. 73/321

Primary Examiner—Charles Frankfort
Assistant Examiner—W. Morris Worth
Attorney, Agent, or Firm—Griffin, Branigan & Butler

[57] ABSTRACT

A mechanical fluid indicator 10 of the type comprising an endless belt 18 having a float 22 and marking elements 20 affixed thereto extending about top and bottom pulleys 16 comprises a tube 12 in which the entire mechanism is mounted. In this respect, holes are machined in the tube's walls at opposite ends thereof and first and second two-piece shafts 28 and 36 are "snapped" into the holes at the opposite ends for respectively mounting the pulleys therein so that the belt and its attachments are mounted in the tube.

3 Claims, 11 Drawing Figures

MECHANICAL FLUID INDICATOR

BACKGROUND OF THE INVENTION

This invention relates broadly to the art of liquid tank depth indicators, and more specifically to such mechanical indicators which are used somewhat in the manner of a dip stick from above a tank.

In the past, the amount of fluid in deep, often underground, tanks, such as are found at service stations, in chemical companies, in ships and at oil and fuel depots has commonly been measured by the use of dip sticks.

An object of this invention, is to provide a mechanical indicator which more easily registers and indicates the amount of fluid found in such deep containers, and underground tanks.

Yet another object of this invention is to provide a mechanical indicator which is lightweight, simple in construction, and easy to fabricate and install.

A further object of this invention is to provide such a mechanical fluid indicator which is particulary corrosion resistant and can, therefore, be used with corrosive materials.

It is a further object of this invention to provide such a mechanical fluid indicator which is easy to read at the top end thereof.

SUMMARY OF THE INVENTION

According to principles of this invention, a mechanical fluid indicator of the type comprising an endless belt having a float and marking indications affixed thereto extending about two free wheeling pulleys is mounted entirely in a single tube. The tube has holes machined in its walls at opposite ends thereof and the pulleys are mounted on two-piece shafts which are snapped into these holes. The tube, pulleys, shafts, belt, and float are constructed of polyvinyl chloride (PVC) plastic.

BRIEF DESCRIPTION OF THE DRAWINGS

The foregoing and other objects, features and advantages of the invention will be apparent from the following more particular description of a preferred embodiment of the invention as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
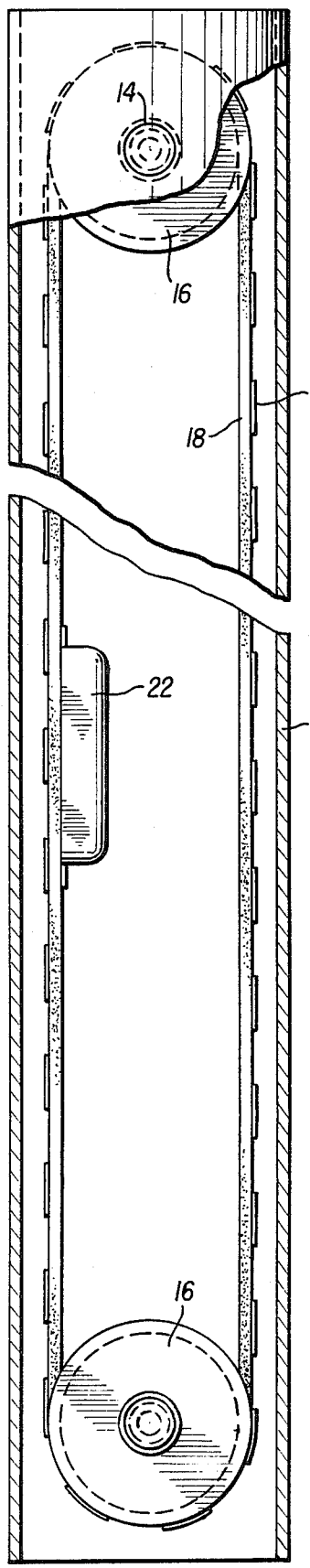
FIG. 1 is a side, partly in section, view of the mechanical fluid depth indicator of this invention.

FIG. 1 shows a mechanical fluid indicator 10 with all its components. A PVC tubing or pipe 12 of a suitable size or diameter is open at both ends. Two holes 14 are machined at both ends of the tube in order to hold pulleys 16 mounted on shafts when pressed into position, as will be described below. The tubing or pipe 12, as well as the pulleys 16 are constructed of PVC plastic.

Figure 7:
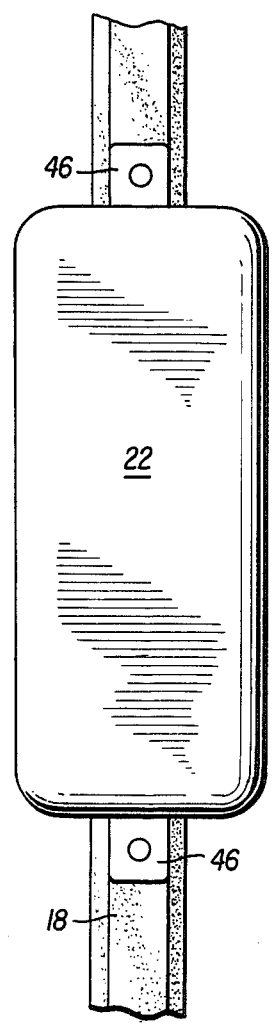
FIG. 7 is a front view of the float of FIG. 6.
Figure 8:
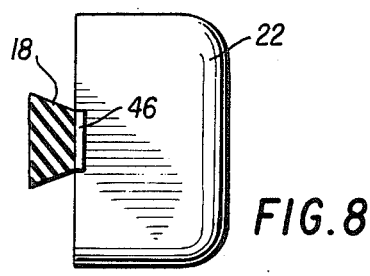
FIG. 8 is a top view of the float of FIG. 6, taken on line 8—8 in FIG. 6, showing the belt on which it is mounted in section.
Figures 9, 10:
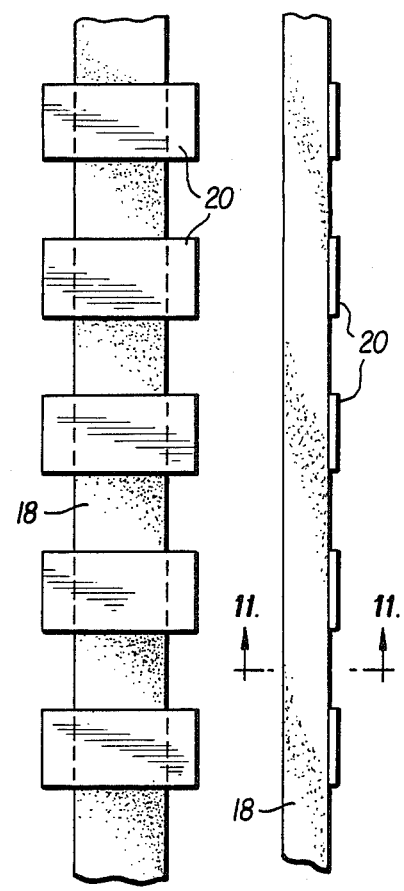
FIGS. 9 and 10 are respectively front and side views of the belt and marking plates of the fluid depth indicator of FIG. 1; and, FIG. 11 is a top view of one marking plate showing the belt on which it is mounted in section taken on line 11—11 in FIG. 10.
Figure 11:
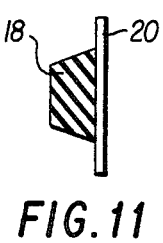

A polyvinyl chloride V-shaped belt 18 having rectangular PVC marking plates 20 affixed thereto is used for registering the amount of fluid in tanks or containers. In this respect, a hollow PVC float 22 is also fastened on the inside of the belt 18 as is depicted in FIGS. 1 and 7. As can be seen, the belt extends between the pulleys 16 which are mounted in the holes 14.

Figure 3:
FIGS. 3 and 4 are opposite end views of the first and second shaft elements of the two-piece shaft of FIG. 2.
Figure 2:
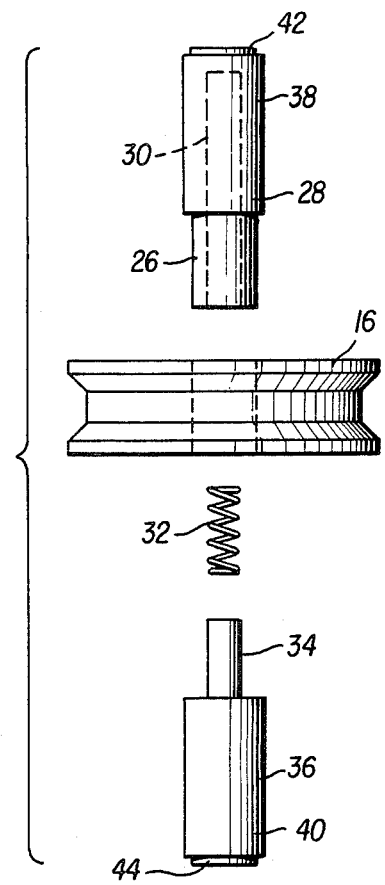
FIG. 2 is an exploded view of a single two-piece shaft and pulley assembly which is used at opposite ends of the depth indicator depicted in FIG. 1.
Figure 4:
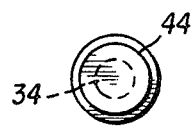
Figure 5:
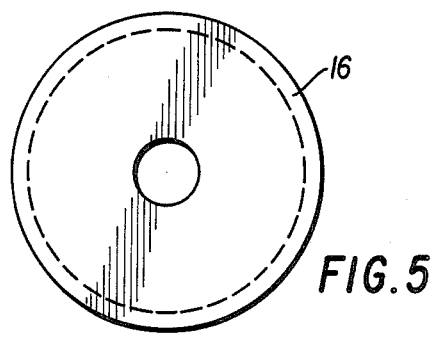
FIG. 5 is a side view of the pulley of FIG. 2.

With regard to mounting the pulleys 16 in the tubing 12, this can best be seen with reference to FIGS. 2, 3, and 4 which show a single pulley assembly, with it being understood that the pulley assemblies at the opposite ends of the tube 12 are identical. The pulley 16 has a circular hole 24 which loosely fits about a smaller portion 26 of a first shaft element 28. The first shaft element 28 is hollow, having a bore 30. A non-ferrite compression spring 32 fits into the bore 30 and a protrusion 34 of a second shaft element 36 also fits into the bore 30 to compress the spring 32. Enlarged portions 38 and 40 of the first and second shaft elements 28 and 36 respectively hold the pulley 16 on the two-piece shaft.

Each of the first and second shaft elements 28 and 36 has at its end, as can be seen in FIGS. 2, 3 and 4, protruding elements 42 and 44 respectively which are "snapped" into the previously mentioned machined holes 14 at the ends of the tubing 12. The compressed force of the spring 32 forces the shaft elements 28 and 36 outwardly, thereby holding the protruding elements 42 and 44 in the holes 14.

Figure 6:
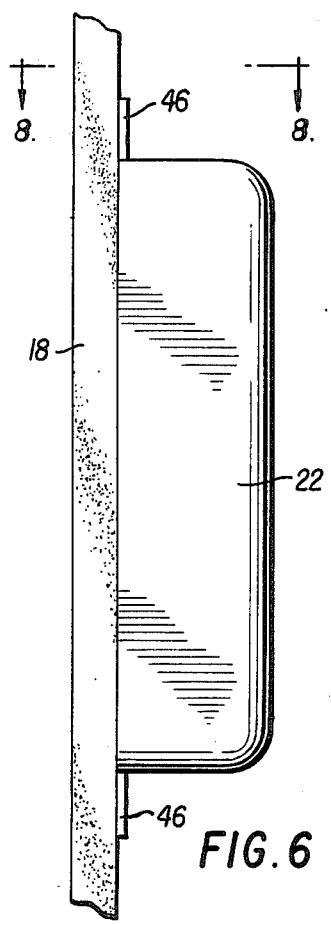
FIG. 6 is a side view of the float of the fluid depth indicator of FIG. 1 showing a portion of the belt to which it is attached.

FIGS. 6–11 show details of construction of the belt 18, float 22 and the marking plates 20. As can be seen in FIGS. 6 and 7, the float 22 includes tabs 46 which are used for attaching the float 22 to the belt 18. The belt 18 is V-shaped as can clearly be seen in FIGS. 8 and 11. The belt can be extruded PVC. The marking plates 20 include indicia for providing an easy and accurate readout of the liquid level.

The float 22 can be extruded and is, of course, attached to the belt at the proper location for providing an accurate readout at the top of the mechanical fluid indicator of the liquid level.

It will be understood by those of ordinary skill in the art that the mechanical fluid indicator described herein will provide an accurate and easy readout of the liquid level of fluids found in deep containers. Further, this mechanical fluid indicator can be made to be lightweight and is quite simple in construction. Further, this mechanical fluid indicator can be easily fabricated and installed. In addition, the mechanical fluid indicator of this invention resists corrosion and is not magnetic. It is nonstatic and explosion proof.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. In a mechanical fluid depth indicator for measuring the level of liquid held in a tank from the top of the tank of the type comprising a first pulley mounted at the top of the depth indicator and a second pulley mounted at the bottom of said depth indicator with an endless belt having a float and marking elements affixed thereto extending about the pulleys such that when the depth indicator is in a liquid the float will rise and fall with the liquid to thereby drive the belt about the pulleys and allow one to read the amount of liquid in the tank from the marking elements, the improvement wherein:

said fluid depth indicator further comprising a single tube extending its entire length, said tube having holes machined in its walls at both ends thereof and a first shaft means mounted in the holes at one end thereof and a second shaft means mounted in the holes at the other end thereof, said first and second shaft means respectively rotatably mounting said first and second pulleys thereon inside said tube so that said belt and its attachments are entirely inside said tube.

2. In a mechanical fluid depth indicator as in claim 1 wherein each of said shaft means is constructed of two elements which telescope together and includes a biasing means for biasing the telescoping elements apart so that ends of the telescoping elements are held in said machined holes.

3. In a mechanical fluid depth indicator as in claim 1 or claim 4 wherein said tube, said belt, said float, and said shaft means are constructed of polyvinyl chloride.

* * * * *